Figures 1, 5:
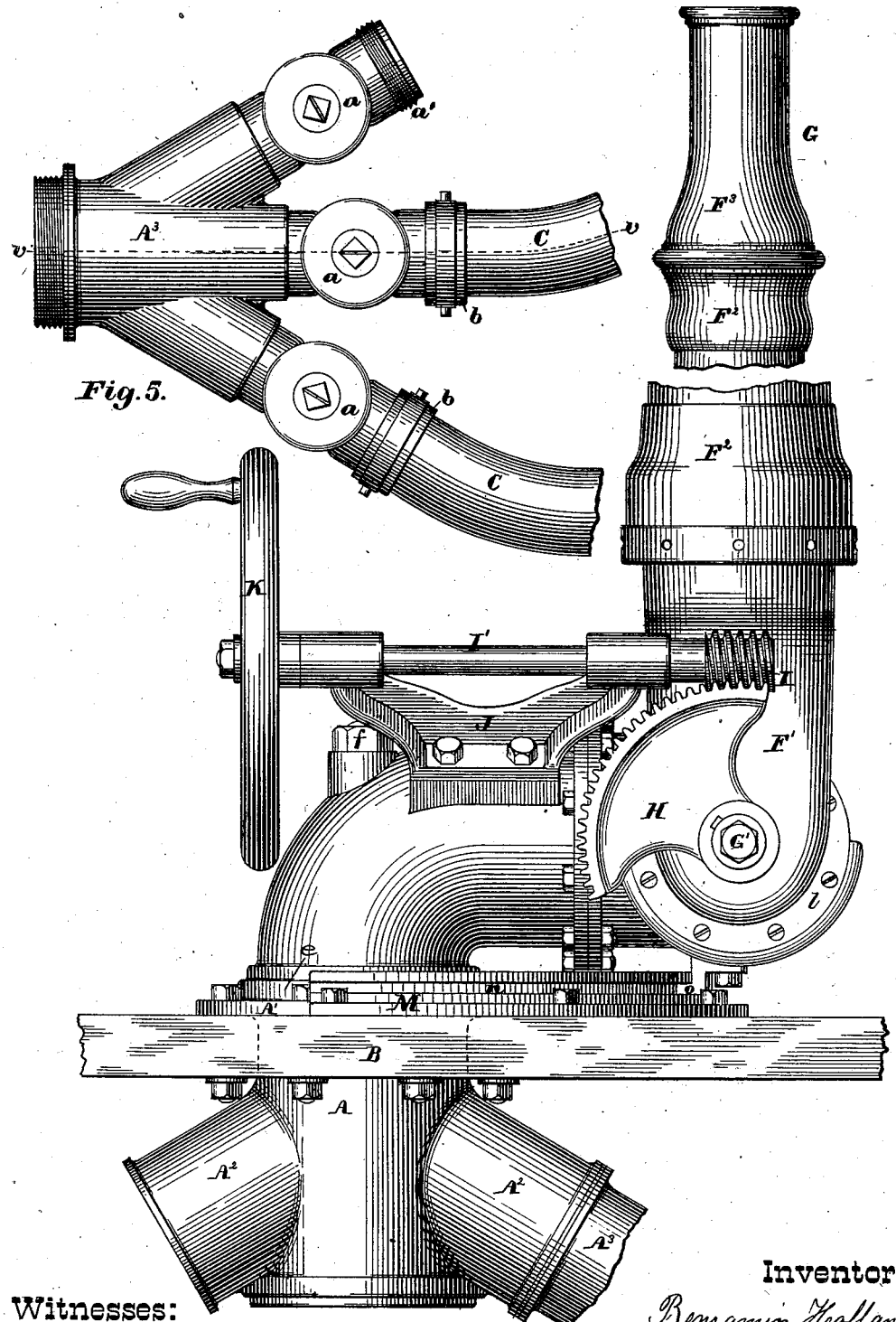

(No Model.) 3 Sheets—Sheet 1.

B. HOLLAND, Jr.
STAND HOSE PIPE.

No. 255,430. Patented Mar. 28, 1882.

Witnesses:
E. A. Hemmenway
Walter E. Lombard

Inventor:
Benjamin Holland Jr
by N. W. Lombard
Attorney.

(No Model.) 3 Sheets—Sheet 2.

B. HOLLAND, Jr.
STAND HOSE PIPE.

No. 255,430. Patented Mar. 28, 1882.

Witnesses:
E. A. Hemmenway
Walter E. Lombard

Inventor:
Benjamin Holland Jr.
by N. C. Lombard
Attorney.

(No Model.) 3 Sheets—Sheet 3.

B. HOLLAND, Jr.
STAND HOSE PIPE.

No. 255,430. Patented Mar. 28, 1882.

Witnesses:
E. A. Hemmenway
Walter E. Lombard.

Inventor:
Benjamin Holland Jr.
by N. C. Lombard
Attorney.

UNITED STATES PATENT OFFICE.

BENJAMIN HOLLAND, JR., OF NEWPORT, RHODE ISLAND, ASSIGNOR TO THOMAS S. NOWELL, TRUSTEE, OF BOSTON, MASSACHUSETTS.

STAND HOSE-PIPE.

SPECIFICATION forming part of Letters Patent No. 255,430, dated March 28, 1882.

Application filed February 6, 1882. (No model.)

*To all whom it may concern:*

Be it known that I, BENJAMIN HOLLAND, Jr., of Newport, in the county of Newport and State of Rhode Island, have invented certain new and useful Improvements in Stand Hose-Pipes, of which the following, taken in connection with the accompanying drawings, is a specification.

My present invention relates especially to the construction of hose pipes of large caliber intended for use in the street and to take and deliver the water from two or more lines of hose; and it consists, first, in the combination of a discharge-pipe bifurcated or divided into two branches at its butt or rear end, and pivoted by said branches to a three-way section, a stationary base-section provided with two inlet-orifices and means of coupling thereto two or more lines of hose, and means of connecting said three-way and base sections together in such a manner that the former may be revolved upon the latter, as will be more fully described.

It further consists in a novel method of mounting the three-way section upon the base-section, whereby the pressure of the water passing through said three-way section acts thereon in opposite directions, and thus equalizes the pressure upon the bearing upon or about which said three-way section revolves, and reduces the friction of said bearing, and consequently the labor required for operating and controlling the hose-pipe.

It further consists in the combination of a base-section having a vertical opening through it and provided with two inlet passages or nozzles and means of connecting thereto two or more lines of hose, a three-way section fitted to a short cylindrical bearing upon the upper side of said base, a curved disk or head fitted to a circular bearing in the lower portion of said base beneath the inlet-passages, suitable flexible packing-rings adapted to be pressed by the water hard upon the joints of said bearings, and a tie-bolt connecting said curved disk with the three-way section in such a manner that said disk may be adjusted toward or from said three-way section for the purpose of tightening or loosening the bearing, and at the same time be compelled to revolve with the three-way section and serve to resist the upward pressure of the water upon the three-way section.

It further consists in the combination of a stationary base provided with two inlet-passages communicating with two or more lines of hose, and with a partition dividing the lower portion of the interior of said base-section into two parts, a three-way pipe-section, a curved disk or head, and a bolt and suitable nuts for connecting said disk or head to the three-way section in such a manner that it must revolve therewith.

It further consists in a novel arrangement of the packing for rendering the joint between the stationary base and the revolving three-way section water-tight, and in a novel construction and arrangement of some of the parts, which will be best understood by reference to the description of the drawings and the claims to be hereinafter given.

Figure 3:
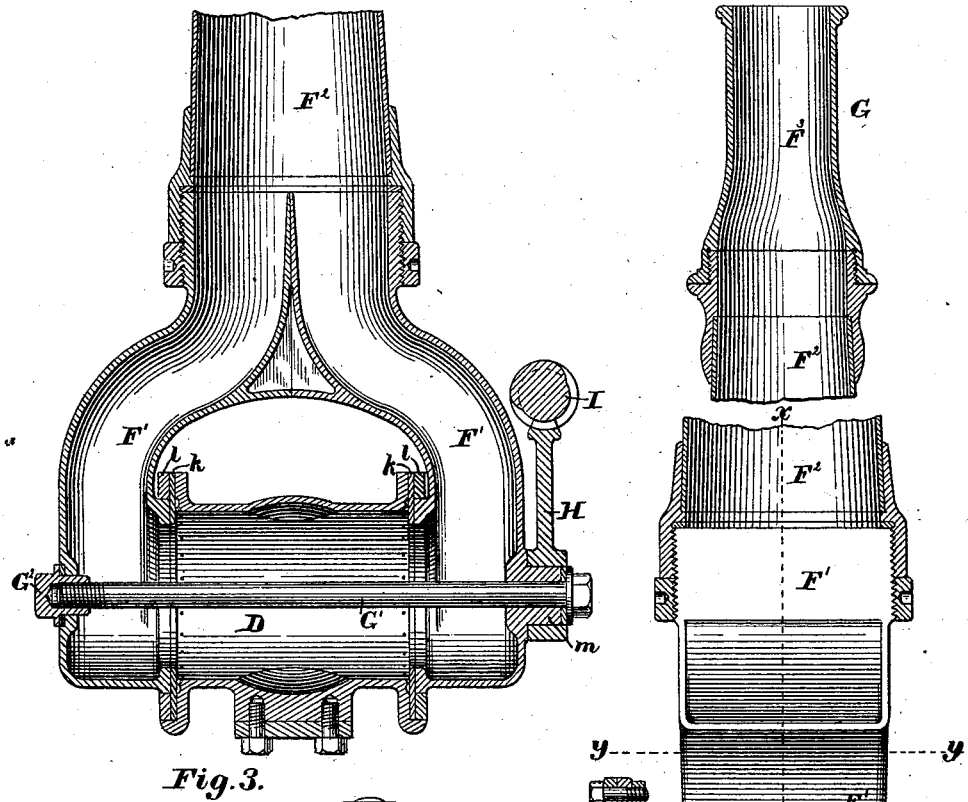
Figure 2:
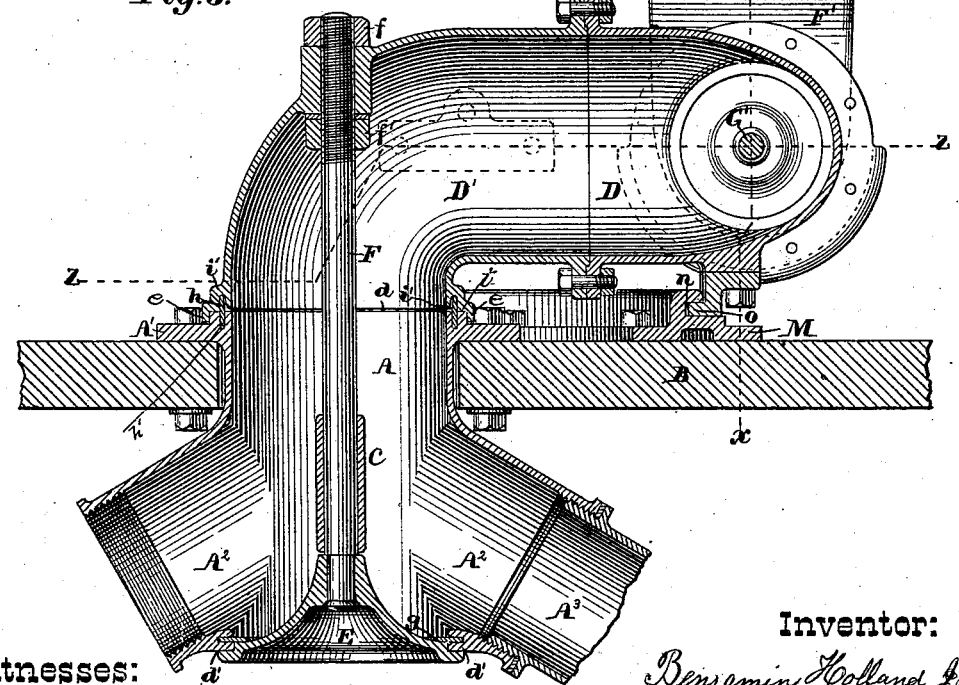
Figure 4:
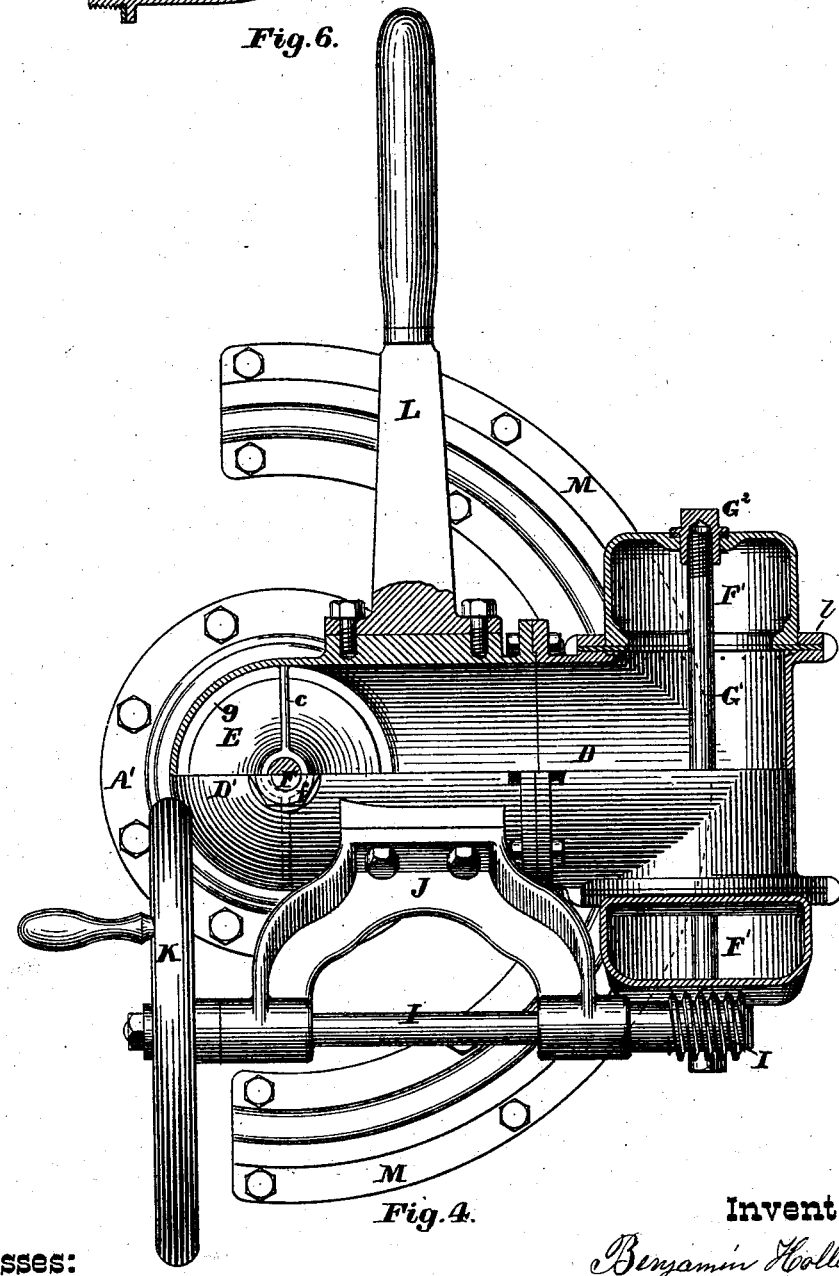

Figure 1 of the drawings is a side elevation of my improved stand hose-pipe. Fig. 2 is a central vertical section. Fig. 3 is a partial vertical section of same on line $x, x$ on Fig. 2. Fig. 4 is a sectional plan, the cutting-plane of that portion below the center line being on line $y\ y$ on Fig. 2 and that above the center line on line $z\ z$ on Fig. 2. Fig. 5 is a plan of a three-branch pipe, illustrating the method of connecting a series of hose to the stationary base; and Fig. 6 is a longitudinal section of same on line $v\ v$.

Figure 6:
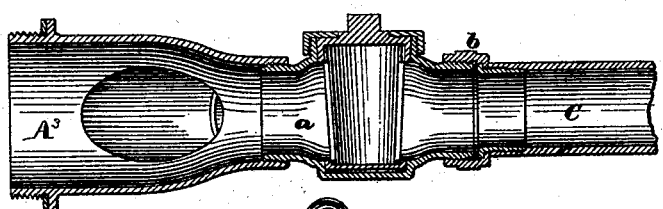

A is the base-ring, provided with the flange A', by which it is secured to the platform B of a suitable carriage, and having a vertical opening through it and two inlet passages or nozzles, $A^2\ A^2$, each adapted to receive the large end of the three-branch pipe $A^3$, to each of the small branches of which is secured a plug cock or valve, $a$, which is provided with a screw-thread, $a'$, to receive a female coupling-ring, $b$, of a line of hose, C, as shown in Figs. 5 and 6. The base-ring A is also provided with a partition, $c$, which divides its lower portion into two parts, and the annular bearing shoulders or surfaces $d$ and $d'$, the purpose of which will presently appear.

D D' is a three-way pipe-section, made for convenience in two parts and bolted together, and provided with the annular lip e, which embraces the upper cylindrical portion of the base A and rests upon the bearing-surface d, the part D' being curved, so as to turn the water from a vertical to a horizontal direction.

E is a disk or head fitted to the circular opening in the lower portion of the base A, and bearing around its outer edge upon the shoulder or bearing-surface d' of the base A, and having its central portion curved upward, as shown in Fig. 2, and having secured thereto the bolt F, the upper end of which is provided with a male screw-thread and the nuts f and f', by which it is secured to the upper part of the part D' of the three-way pipe-section, as shown.

The partition c has its lower edge finished to fit nicely to the finished curved upper or inner surface of the disk E, and serves to keep the streams of water entering said base separate till they are turned in an upward direction.

A flexible packing-ring, g, of leather or other suitable material, is inserted in a groove formed in the inner periphery of the base just above the outer portion of the disk E, and projects inward in a horizontal direction across the joint formed between said disk and base, as shown in Fig. 2.

An annular groove, h, is formed in the upper end of the cylindrical portion of the base A, into which is fitted closely the packing-ring h', of leather or other flexible material, which projects upward above the top of said base in the form of a short cylinder, and laps over the joint between the top of said base and the shoulder i of said three-way pipe-section, an annular groove, i', being formed in the lower end of said three-way section, into which said packing-ring h' projects and fits loosely, said groove i' being so formed that the water will enter between its inner wall and said packing-ring, and thus press said ring outward, to insure a perfect packing of the joint.

G is a bifurcated pipe, made up of four sections, F', F', F², and F³, constructed substantially as described in a prior application of mine filed in the Patent Office at Washington, District of Columbia, August 11, 1881, and connected to the three-way pipe-section D by means of the bolt G' and nut G² in the same manner as described in said prior application. A packing-ring, k, of leather or other suitable flexible material, is placed between the circular flange of each of the branches F' F' of the pipe G and the ends of the horizontal portion of the three-way section, and secured in position by the ring l, firmly screwed to said three-way section, as shown in Fig. 1. One of the sections or branches, F', of the bifurcated pipe G has formed thereon a hub or boss, m, to which is firmly secured the segment of a worm-wheel, H, with which the worm I, mounted on the shaft I', engages to impart a vibratory motion to the pipe G about the axis of the bolt G', said shaft I' being mounted in bearings in the stand J, secured to the three-way pipe-section D D', and provided with the hand wheel or crank K, by which it may be revolved.

L is a lever, also bolted to the three-way pipe-section D D', by means of which said section may be revolved around the axis of the bolt F.

M is a segmental guide, secured upon the carriage-platform B and provided with the groove n, into which is fitted the lip o, secured to the three-way pipe-section D, said guide and lip serving as an additional support and guide for said three-way pipe-section in its movements about the axis of the bolt G'.

It is a well-known fact that in discharging water under pressure from a hose-pipe a reactionary effect is produced upon said pipe, which tends to force the pipe from the hands of the hosemen toward the rear, and that said reactionary force is increased with the increase of the size of stream discharged if the pressure is maintained.

I have found by actual test that in using my bifurcated pipe in combination with the three-way section the objectionable reactionary force is overcome or counteracted whenever the stream is discharged in a direction in line with the movement of the current of the water just before it is divided in the three-way section to be forced through the two arms of the bifurcated pipe, but that said force appears and asserts itself whenever the discharge-pipe is so held as to deliver the stream in a direction at right angles, or nearly so, to the direction of the current of water just before it is divided in the three-way section, as above described. To obviate as much as possible the objectionable features of this reactionary force, I have provided the three-way section D D' with the quarter turn or bend, so that the current of water just before being divided in said three-way section to pass into the branches F' F' of the pivoted pipe G shall move in a horizontal direction, and by impinging upon the end wall of said section counteract the reactionary force caused by the discharge of the water from the nozzle of the pipe when said pipe is so held as to direct its streams horizontally, or nearly so, and so that the recoil caused by the discharge of the stream from the nozzle when the pipe is turned at right angles, or nearly so, to the direction of the current of water just before it is divided in the three-way section, as before described, shall be received by the carriage and transmitted through it to the ground, thereby making it much easier to hold the pipe in the desired position.

By the employment of this improved stand hose-pipe I am enabled to concentrate and direct to any desired point a very powerful stream of water without requiring the services of several men to hold and control the pipe, as is the case with the pipes now in use.

The construction of this apparatus is such that the pressures are to a great extent equalized, and hence the pipe G may be moved about its pivotal axis and revolved about a vertical axis with the three-way section with comparative ease, and said pipe may be maintained at any desired angle of elevation or pointing to any point of the compass by one man, while it discharges a stream of water three inches in diameter.

What I claim as new, and desire to secure by Letters Patent of the United States, is—

1. The combination of the bifurcated hose-pipe G, the three-way section D D', the stationary base A, provided with two inlet-passages, and means of coupling thereto two or more lines of hose, and means of securing the base and three-way sections together and permitting the latter to be revolved upon the former, substantially as and for the purposes described.

2. The base A, provided with two inlet-passages, A', and the two annular shoulders $d$ and $d'$, in combination with a three-way section connected to said base by virtue of bearings upon said shoulders $d$ and $d'$, and adapted to be revolved thereon, substantially as and for the purposes described.

3. The combination of the base A, provided with the annular shoulders $d$ and $d'$, and two inlet-passages communicating with two or more lines of hose, the three-way section D D', the curved disk or head E, the packing-rings $g$ and $h'$, and the bolt F and nuts $f$ and $f'$, all arranged and adapted to operate substantially as and for the purposes described.

4. The stationary base A, provided with the annular groove $h$, the packing-ring $h'$, secured in said groove, the three-way section D D', fitted to and having a bearing upon the upper portion of said base, and provided with the annular groove $i'$, to receive the upper edge of said packing, all constructed, arranged, and combined to operate substantially as and for the purposes described.

5. The combination of the base A, three-way section D D', the bifurcated pipe G, the worm-wheel segment H, and the worm I, all arranged and adapted to operate substantially as and for the purposes described.

6. The base A, provided with two inlet-passages communicating with two or more lines of hose, and the partition $c$, in combination with the three-way pipe-section D D', the curved disk or head E, the bolt F, and the nuts $f$ and $f'$, all constructed, arranged, and adapted to operate substantially as described.

7. The combination of the stationary base A, the three-way section D D', provided with a quarter turn or bend, as set forth, and the bifurcated discharge-pipe G, all arranged and adapted to operate substantially as described.

8. The combination of the platform B, the base A, and segmental guide M, secured thereon, the three-way section D D', provided with a quarter turn or bend, the bifurcated pipe G, and the supporting and guiding lip $o$, all arranged and adapted to operate substantially as described.

Executed at Boston, Massachusetts, this 4th day of February, A. D. 1882.

BENJAMIN HOLLAND, JR.

In presence of—
 E. A. HEMMENWAY,
 WALTER E. LOMBARD.